US012756509B2

(12) United States Patent
Cui et al.

(10) Patent No.: US 12,756,509 B2
(45) Date of Patent: Oct. 6, 2026

(54) REFERENCE SIGNAL MEASUREMENT MECHANISMS DURING SECONDARY CELL ACTIVATION IN NEW RADIO

(71) Applicant: Apple Inc., Cupertino, CA (US)

(72) Inventors: Jie Cui, San Jose, CA (US); Yang Tang, San Jose, CA (US); Dawei Zhang, Saratoga, CA (US); Qiming Li, Beijing (CN); Manasa Raghavan, Sunnyvale, CA (US); Xiang Chen, Campbell, CA (US); Huaning Niu, San Jose, CA (US); Qunfeng He, San Diego, CA (US); Hong He, Cupertino, CA (US); Haitong Sun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 244 days.

(21) Appl. No.: 18/834,863

(22) PCT Filed: Feb. 11, 2022

(86) PCT No.: PCT/CN2022/076008

§ 371 (c)(1),
(2) Date: Jul. 31, 2024

(87) PCT Pub. No.: WO2023/151020

PCT Pub. Date: Aug. 17, 2023

(65) Prior Publication Data

US 2025/0167942 A1 May 22, 2025

(51) Int. Cl.
*H04B 17/309* (2015.01)
*H04L 5/00* (2006.01)
*H04W 24/10* (2009.01)

(52) U.S. Cl.
CPC ............ *H04L 5/0035* (2013.01); *H04L 5/001* (2013.01); *H04L 5/0098* (2013.01); *H04W 24/10* (2013.01)

(58) Field of Classification Search
CPC ..... H04L 5/0035; H04L 5/001; H04L 5/0098; H04L 5/0023; H04L 5/0053; H04L 5/0048; H04L 5/0057; H04W 24/10; H04W 52/0229; H04W 52/0245; H04B 17/347
See application file for complete search history.

(56) References Cited

U.S. PATENT DOCUMENTS

2019/0159126 A1 5/2019 Kadiri
2021/0258892 A1 8/2021 Akkarakaran
2023/0096588 A1* 3/2023 Yang ..................... H04L 5/0035 370/329
2023/0140323 A1* 5/2023 Wang ..................... H04B 17/24 370/329
2024/0063991 A1* 2/2024 Liu ......................... H04L 5/001

FOREIGN PATENT DOCUMENTS

CN 109479217 3/2019
CN 113647170 11/2021
WO 2021146161 7/2021

OTHER PUBLICATIONS

International Search Report and Written Opinion for PCT/CN2022/076008; Oct. 27, 2022.
Qualcomm Inc et al. "Discussion on fast SCell activation based on measurements prior to activation in NR"; 3GPP TSG RAN WG1 Meeting #107 R2-1908684; Aug. 30, 2019.

* cited by examiner

*Primary Examiner* — Thai Nguyen
(74) *Attorney, Agent, or Firm* — Kowert, Hood, Munyon, Rankin & Goetzel, P.C.

(57) ABSTRACT

A user equipment (UE) may receive, from a base station (BS) configured to support activation of a secondary cell (SCell), a request to provide a measurement report. In response to the request, the UE may perform one or more measurements on the SCell using one or more reference signals (RSs). Additionally or alternatively, the UE may generate the measurement report based on the one or more measurements and further transmit the measurement report to the BS. In some embodiments, the UE may further determine a pathloss estimation based on the one or more measurements.

20 Claims, 12 Drawing Sheets

REFERENCE SIGNAL MEASUREMENT MECHANISMS DURING SECONDARY CELL ACTIVATION IN NEW RADIO

PRIORITY INFORMATION

This application is a national phase entry of PCT Application No. PCT/CN2022/076008, entitled "Improved Reference Signal Measurement Mechanisms During Secondary Cell Activation in New Radio," filed Feb. 11, 2022, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for improved reference signal measurement mechanisms during secondary cell activation in New Radio (NR).

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, cHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Accordingly, improvements in the field in support of such development and design are desired.

SUMMARY

Embodiments relate to wireless communications, and more particularly to apparatuses, systems, and methods for improved reference signal measurement mechanisms during secondary cell activation in New Radio (NR).

In some embodiments, a user equipment (UE) may receive, from a base station (BS) configured to support activation of a secondary cell (SCell), a request to provide a measurement report. In response to the request, the UE may perform one or more measurements on the SCell using one or more reference signals (RSs). Additionally or alternatively, the UE may generate the measurement report based on the one or more measurements and further transmit the measurement report to the BS. In some embodiments, the UE may further or alternatively support pathloss estimation based on the one or more measurements.

According to some embodiments, the SCell may be a physical uplink control channel (PUCCH) SCell which has not been previously measured by the UE. Additionally or alternatively, the one or more RSs may include at least one of one or more pathloss-reference signals (PL-RSs) and one or more other downlink reference signals (DL-RSs). In some embodiments, the one or more PL-RSs may or may not have been configured by the base station prior to the request. According to further embodiments, the measurement report may be a layer-1 (L1) reference signal received power (RSRP) measurement report. Additionally or alternatively, the UE may be configured to report, based on the one or more RSs being configured by the BS prior to activation of the SCell, a layer-3 reference signal received power (L3-RSRP) measurement to the BS before activation of the Scell. In some embodiments, the UE may be configured to determine a pathloss estimation based on the L3-RSRP measurement.

According to further embodiments, the one or more PL-RSs may be quasi-collocated (QCL) with the one or more other DL-RSs. Additionally or alternatively, the UE may further perform one or more additional pathloss measurements based at least in part on the one or more DL-RSs being QCL with the one or more PL-RS and an activation of at least one of a PL-RS and uplink spatial relation (USR). Furthermore, the UE may determine an additional pathloss estimation based on the one or more additional pathloss measurements, according to some embodiments. In some embodiments, the pathloss estimation may be usable by the UE in avoiding the one or more additional pathloss measurements.

In some embodiments, the UE may further perform one or more additional pathloss measurements based at least in part on an activation of at least one of the one or more PL-RSs and an uplink spatial relation (USR). Additionally or alternatively, the UE may determine an additional pathloss estimation based on the one or more additional pathloss measurements. According to some embodiments, the UE may further receive an indication from the base station to perform one or more additional pathloss measurements after activation of at least one of the one or more PL-RSs and an USR or refrain from performing one or more additional pathloss measurements after activation of at least one of the one or more PL-RSs and an USR. Additionally or alternatively, the indication may be included in at least one of radio resource control (RRC) signaling, media access control (MAC), or downlink control information (DCI).

According to further embodiments, a base station (BS) may be configured to support activation of a secondary cell (SCell). The BS may also be configured to transmit a request to a user equipment (UE) to provide a measurement report. Additionally or alternatively, the BS may further receive the measurement report from the UE, wherein the measurement report may include information corresponding to one or more measurements performed by the UE on the SCell based on one or more reference signals (RSs). In some embodiments, the BS may configure, based on the measurement report, at least one of a pathloss reference signal (PL-RS), a transmission configuration indicator (TCI), and an uplink spatial relation corresponding to the SCell and activate the at least one of the PL-RS, the TCI, and the USR.

According to some embodiments, the Scell may be a physical uplink control channel (PUCCH) SCell which has been previously measured by the UE. Additionally or alternatively, the measurement report may be a layer-3 (L3) reference signal received power (RSRP) measurement report received from the UE prior to activation of the SCell. In some embodiments, the one or more RSs may include at least one of one or more pathloss-reference signals (PL-RSs) and one or more other downlink reference signals (DL-RSs). Additionally or alternatively, the one or more PL-RSs may be quasi-collocated (QCL) with the one or more other DL-RSs. According to some embodiments, the measurement report may be a layer-1 (L1) RSRP measurement report.

The techniques described herein may be implemented in and/or used with a number of different types of devices, including but not limited to unmanned aerial vehicles (UAVs), unmanned aerial controllers (UACs), base stations, access points, cellular phones, tablet computers, wearable computing devices, portable media players, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
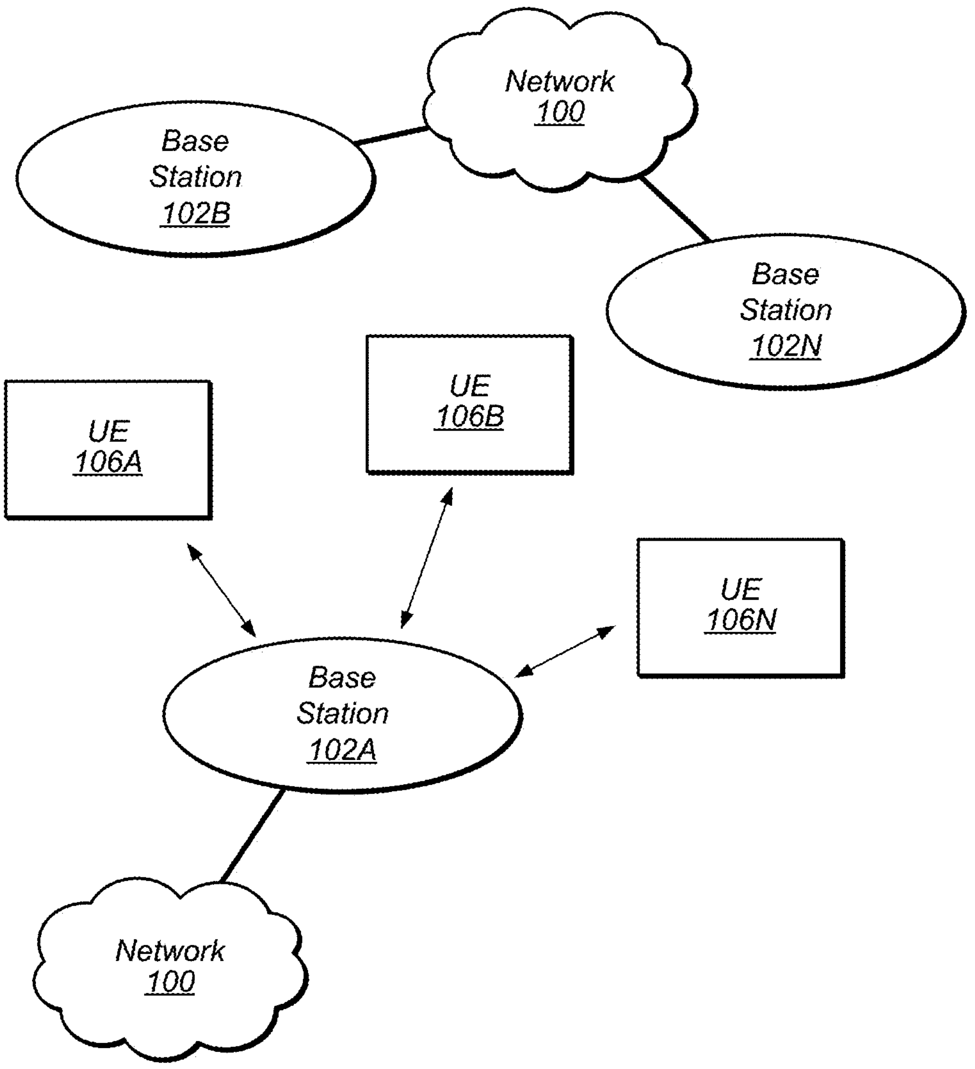
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification
RAN: Radio Access Network
RAT: Radio Access Technology
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC: 5G Core Network
IE: Information Element
QCL: Quasi-Collocated
SCell: Secondary Cell.
PL: Pathloss.
PL-RS: Pathloss Reference Signal
DL-RS: Downlink Reference Signal
PUCCH: Physical Uplink Control Channel
TCI: Transmission Configuration Indicator
L3: Layer 3

L1: Layer 1
RSRP: Reference Signal Received Power
MAC-CE: Media Access Control-Control Element
DCI: Downlink Control Information
RRC: Radio Resource Control
FR2: Frequency Range 2
USR: Uplink Spatial Relation Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAS, portable Internet devices, music players, data storage devices, other handheld devices, automobiles and/or motor vehicles, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by (or with) a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
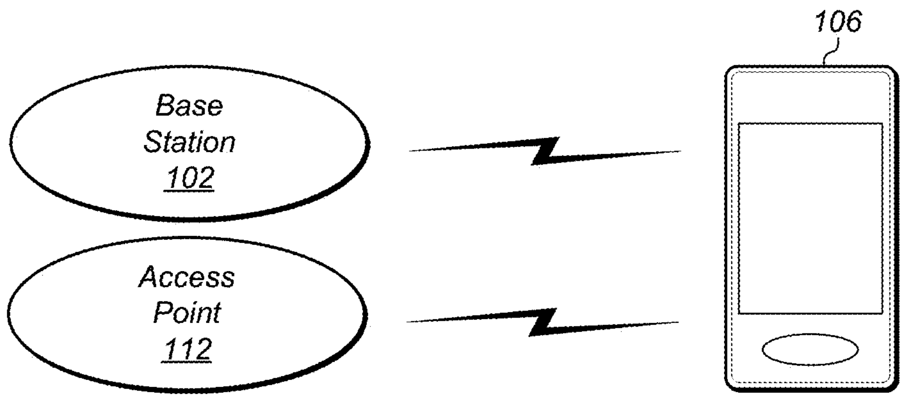
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, cHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/CHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
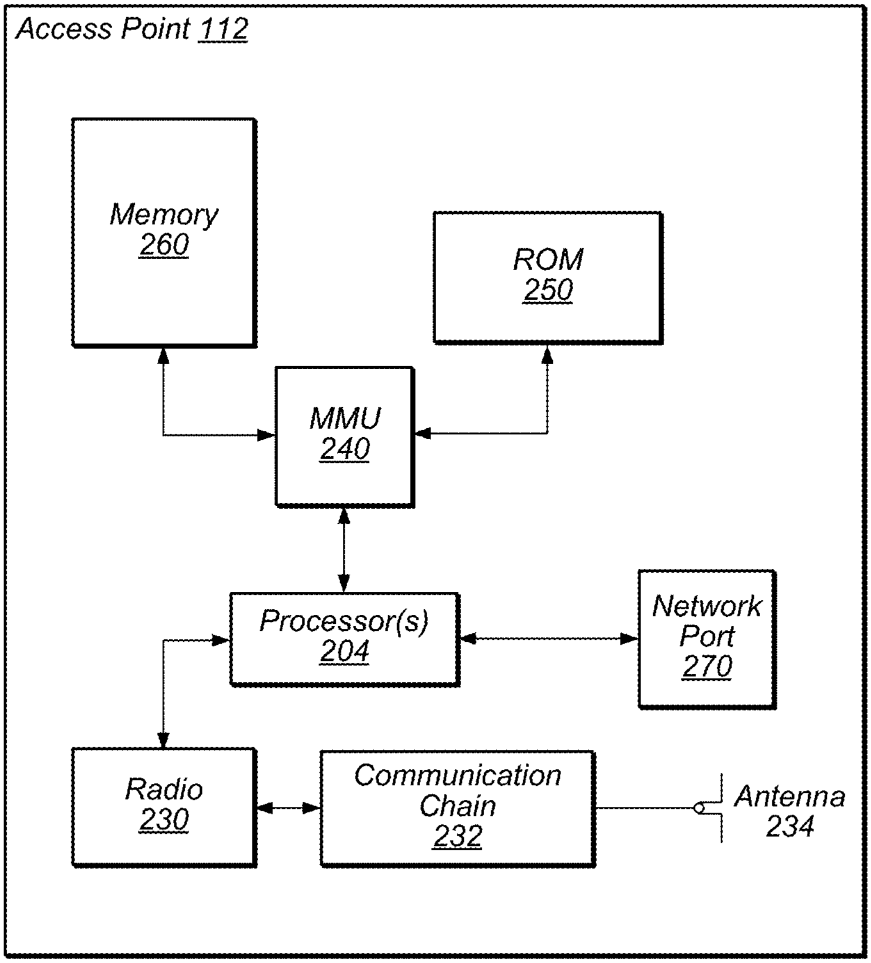
FIG. 2 illustrates an example simplified block diagram of a WLAN Access Point (AP), according to some embodiments.

FIG. 2: Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for overhead reduction for multi-carrier beam selection and power control as further described herein.

Figure 3A:
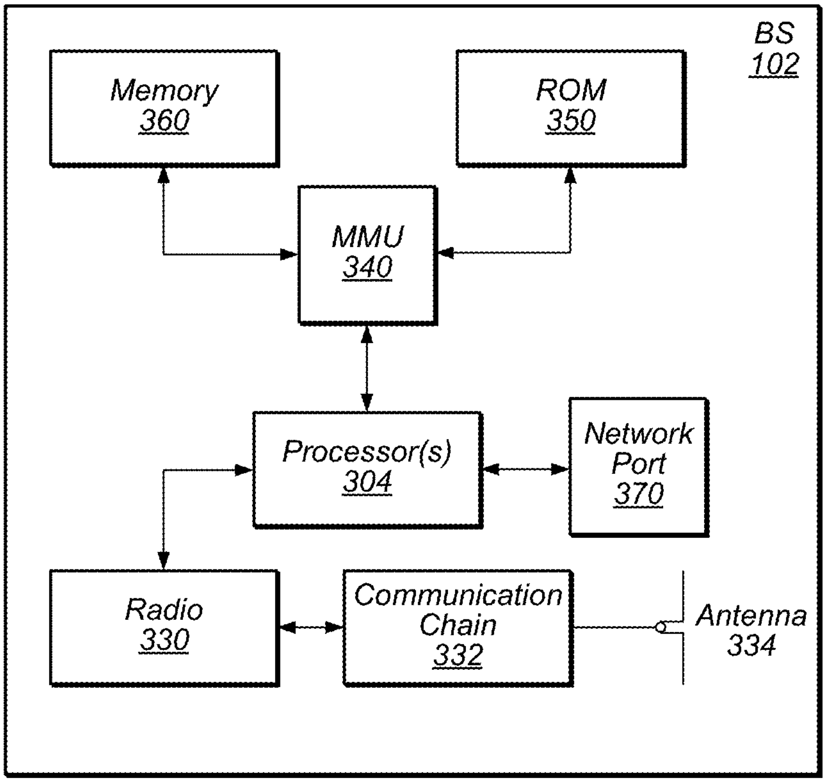
FIG. 3A illustrates an example block diagram of a BS according to some embodiments.

FIG. 3A: Block Diagram of a Base Station

FIG. 3A illustrates an example block diagram of a base station 102, according to some embodiments. It is noted that the base station of FIG. 3A is merely one example of a possible base station. As shown, the base station 102 may include processor(s) 304 which may execute program instructions for the base station 102. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above in FIGS. 1 and 2.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 334, and possibly multiple antennas. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 304 of the base station 102 may be configured to implement or support implementation of part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof. Alternatively (or in addition) the processor 304 of the BS 102, in conjunction with one or more of the other components 330, 332, 334, 340, 350, 360, 370 may be configured to implement or support implementation of part or all of the features described herein.

In addition, as described herein, processor(s) 304 may include one or more processing elements. In other words, one or more processing elements may be included in processor(s) 304. Thus, processor(s) 304 may include one or more integrated circuits (ICs) that are configured to perform the functions of processor(s) 304. In addition, each integrated circuit may include circuitry (e.g., first circuitry, second circuitry, etc.) configured to perform the functions of processor(s) 304.

Further, as described herein, radio 330 may include one or more processing elements. In other words, one or more processing elements may be included in radio 330. Thus, radio 330 may include one or more integrated circuits (ICs) that are configured to perform the functions of radio 330. In addition, each integrated circuit may include circuitry (e.g., first circuitry, second circuitry, etc.) configured to perform the functions of radio 330.

Figure 3B:
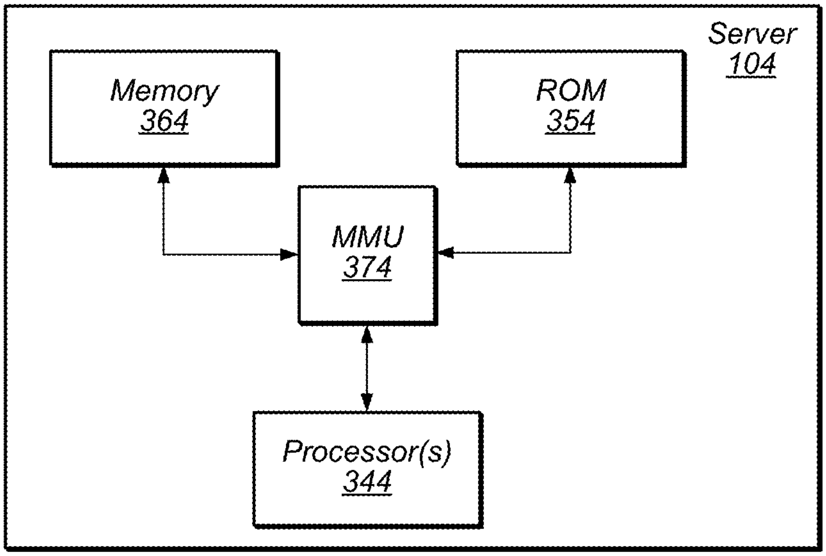
FIG. 3B illustrates an example block diagram of a server according to some embodiments.

FIG. 3B: Block Diagram of a Server

FIG. 3B illustrates an example block diagram of a server 104, according to some embodiments. It is noted that the server of FIG. 3B is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may include one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
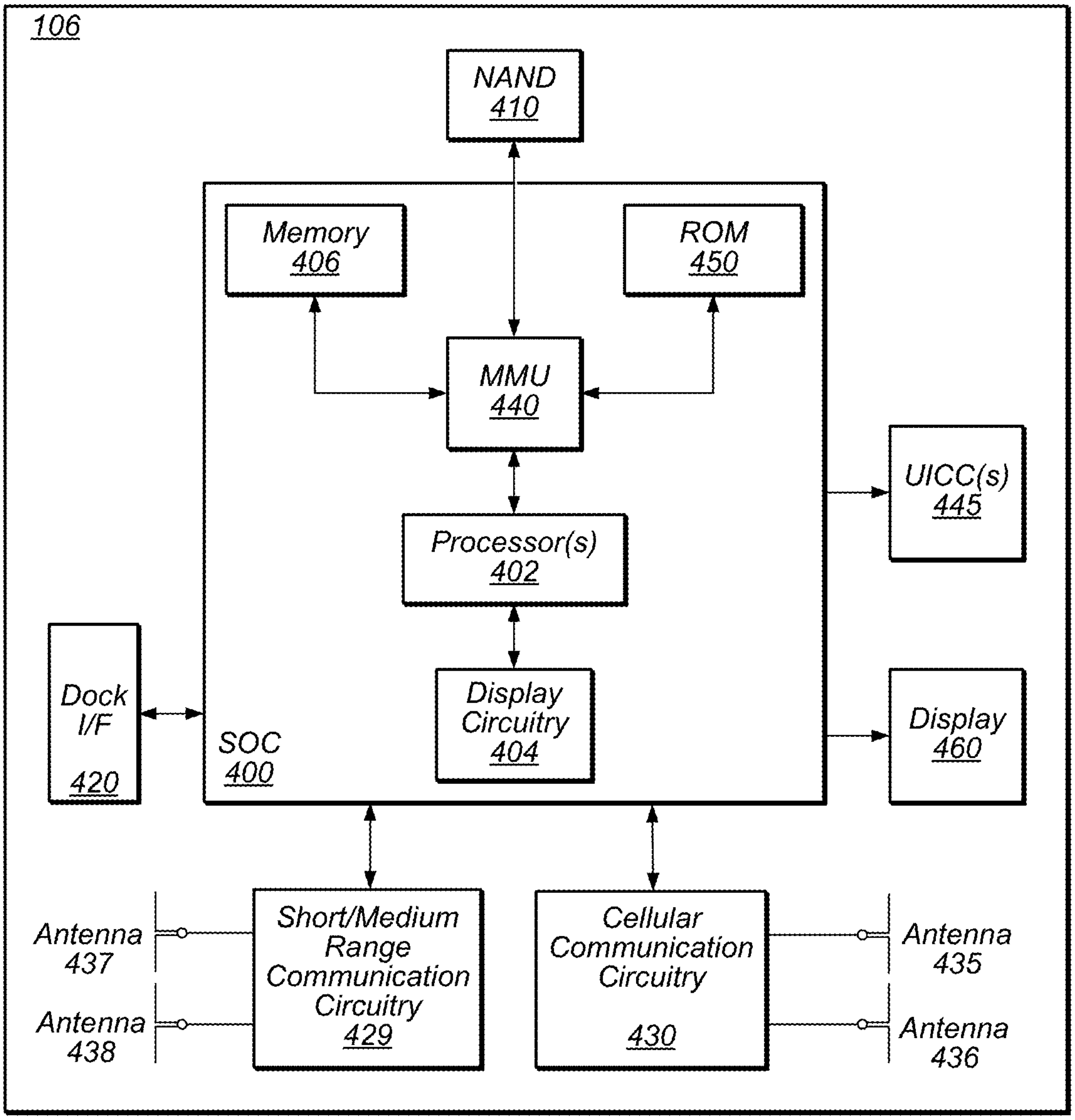
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash memory 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM may be implemented as a removable smart card. Thus, the SIM(s) may be one or more removable smart cards (such as UICC cards, which are sometimes referred to as "SIM cards"), and/or the SIMs may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may include two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM support a second RAT such as 5G NR. Other implementations and RATs are of course possible. In some embodiments, when the UE 106 includes two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VOLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for beam failure recovery based on a unified TCI framework, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
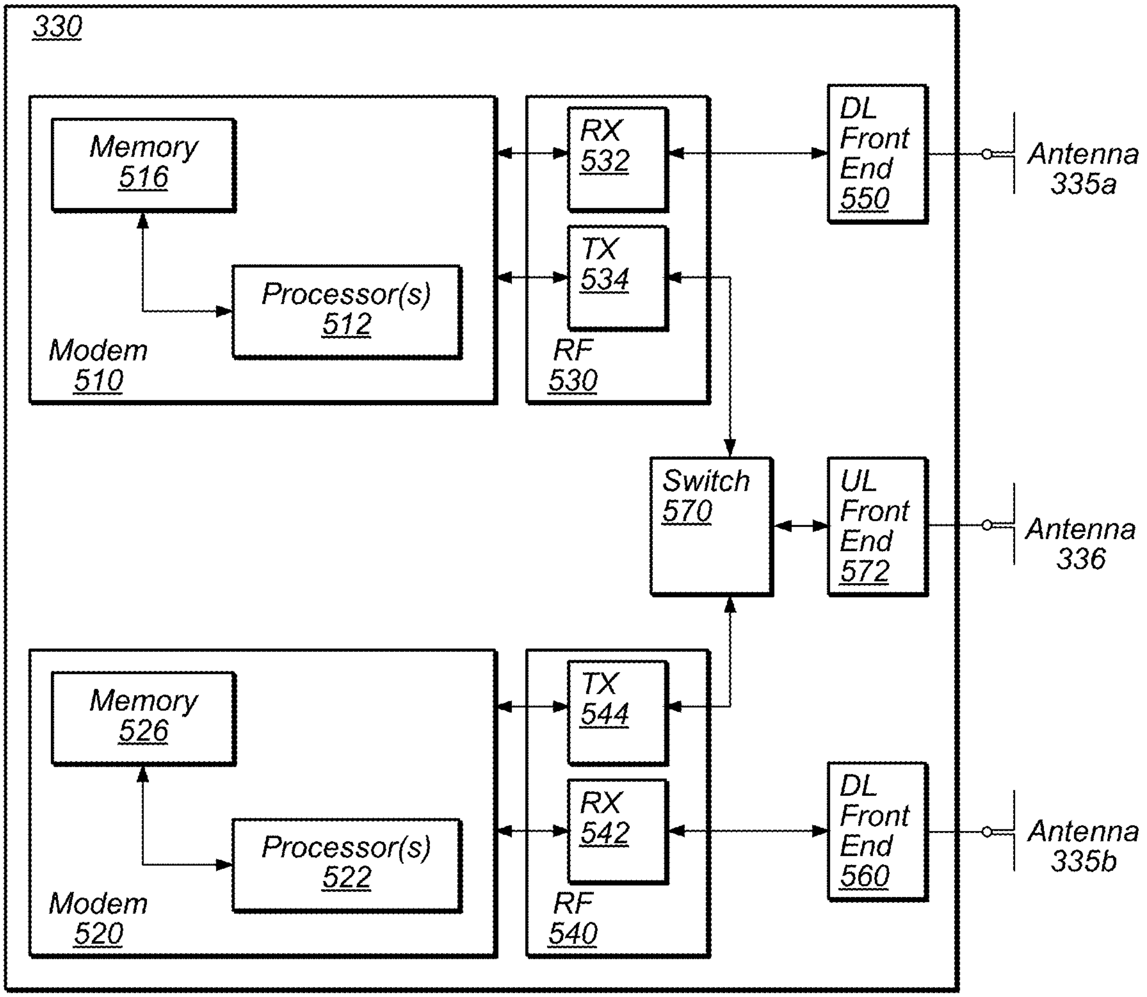
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435*a*-*b* and 436 as shown (in FIG. 4). In some embodiments, cellular communication circuitry 530 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods beam failure recovery based on a unified TCI framework, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
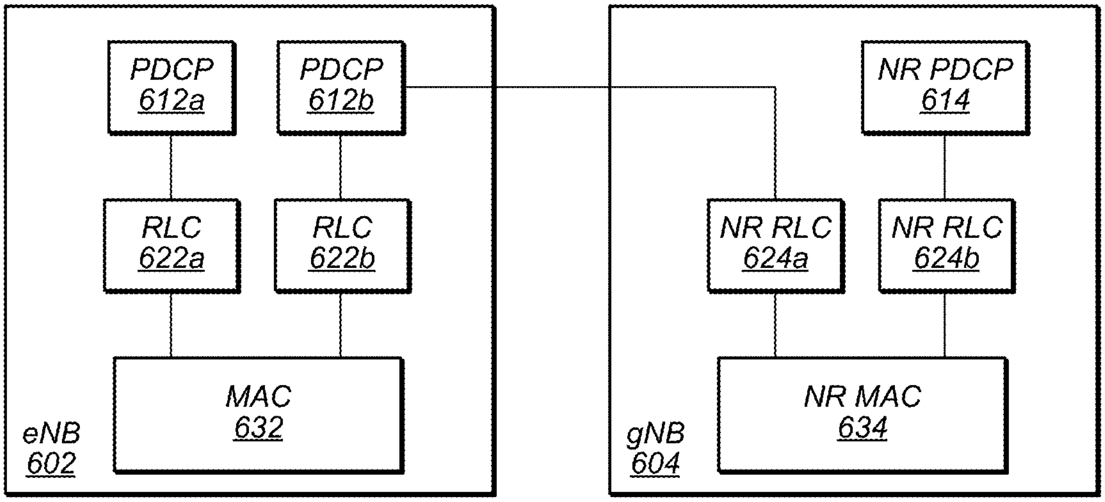
FIG. 6 illustrates an example of a protocol stack for an eNB and a gNB.

FIG. 6: 5G NR Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIG. 6, current LTE base stations (e.g., eNB 602) may be in communication with a 5G NR base station (e.g., gNB 604). FIG. 6 illustrates a proposed protocol stack for eNB 602 and gNB 604. As shown, eNB 602 may include a medium access control (MAC) layer 632 that interfaces with radio link control (RLC) layers 622*a-b*. RLC layer 622*a* may also interface with packet data convergence protocol (PDCP) layer 612*a* and RLC layer 622*b* may interface with PDCP layer 612*b*. Similar to dual connectivity as specified in LTE-Advanced Release 12, PDCP layer 612*a* may interface via a master cell group (MCG) bearer with an evolved packet core (EPC) network whereas PDCP layer 612*b* may interface via a split bearer with the EPC network.

Additionally, as shown, gNB 604 may include a MAC layer 634 that interfaces with RLC layers 624*a-b*. RLC layer 624*a* may interface with PDCP layer 612*b* of eNB 602 via an $X_2$ interface for information exchange and/or coordination (e.g., scheduling of a UE) between NB 602 and gNB 604. In addition, RLC layer 624*b* may interface with PDCP layer 614. Similar to dual connectivity as specified in LTE-Advanced Release 12, PDCP layer 614 may interface with an EPC network via a secondary cell group (SCG) bearer. Thus, eNB 602 may be considered a master node (MeNB) while gNB 604 may be considered a secondary node (SgNB). In some scenarios, a UE may need to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Figure 7A:
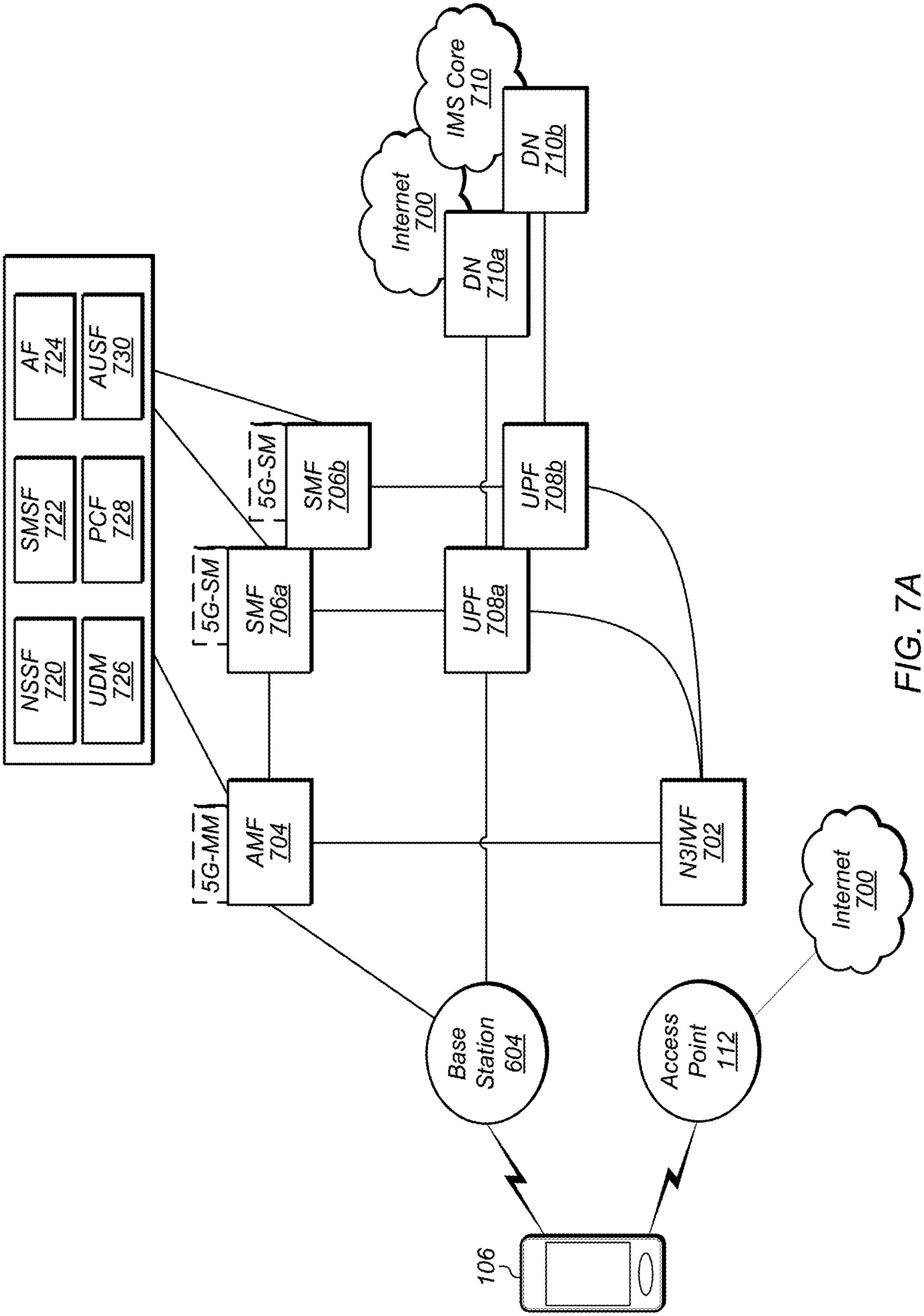
FIG. 7A illustrates an example of a 5G network architecture that incorporates both 3GPP (e.g., cellular) and non-3GPP (e.g., non-cellular) access to the 5G CN, according to some embodiments.
Figure 7B:
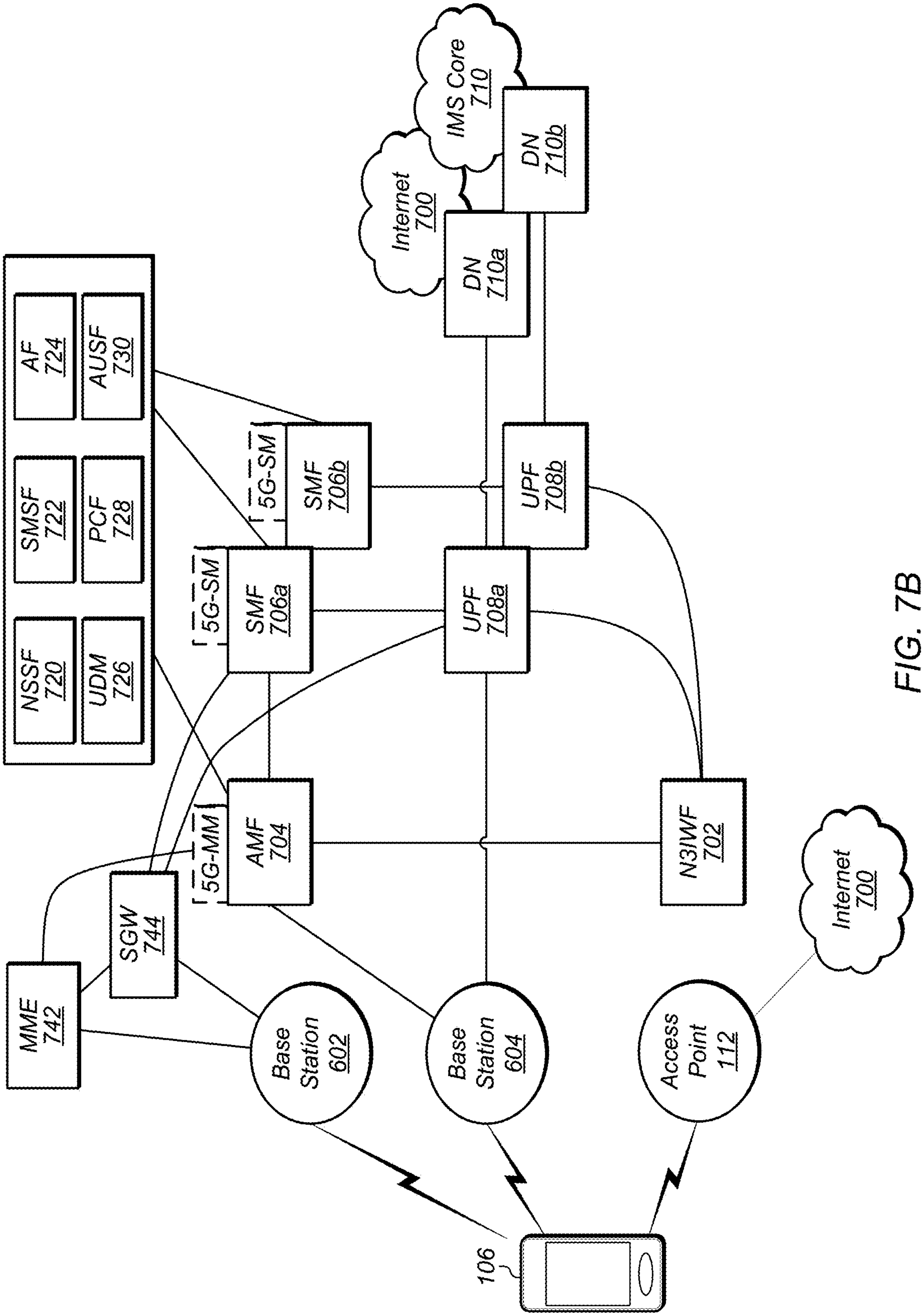
FIG. 7B illustrates an example of a 5G network architecture that incorporates both dual 3GPP (e.g., LTE and 5G NR) access and non-3GPP access to the 5G CN, according to some embodiments.
Figure 8:
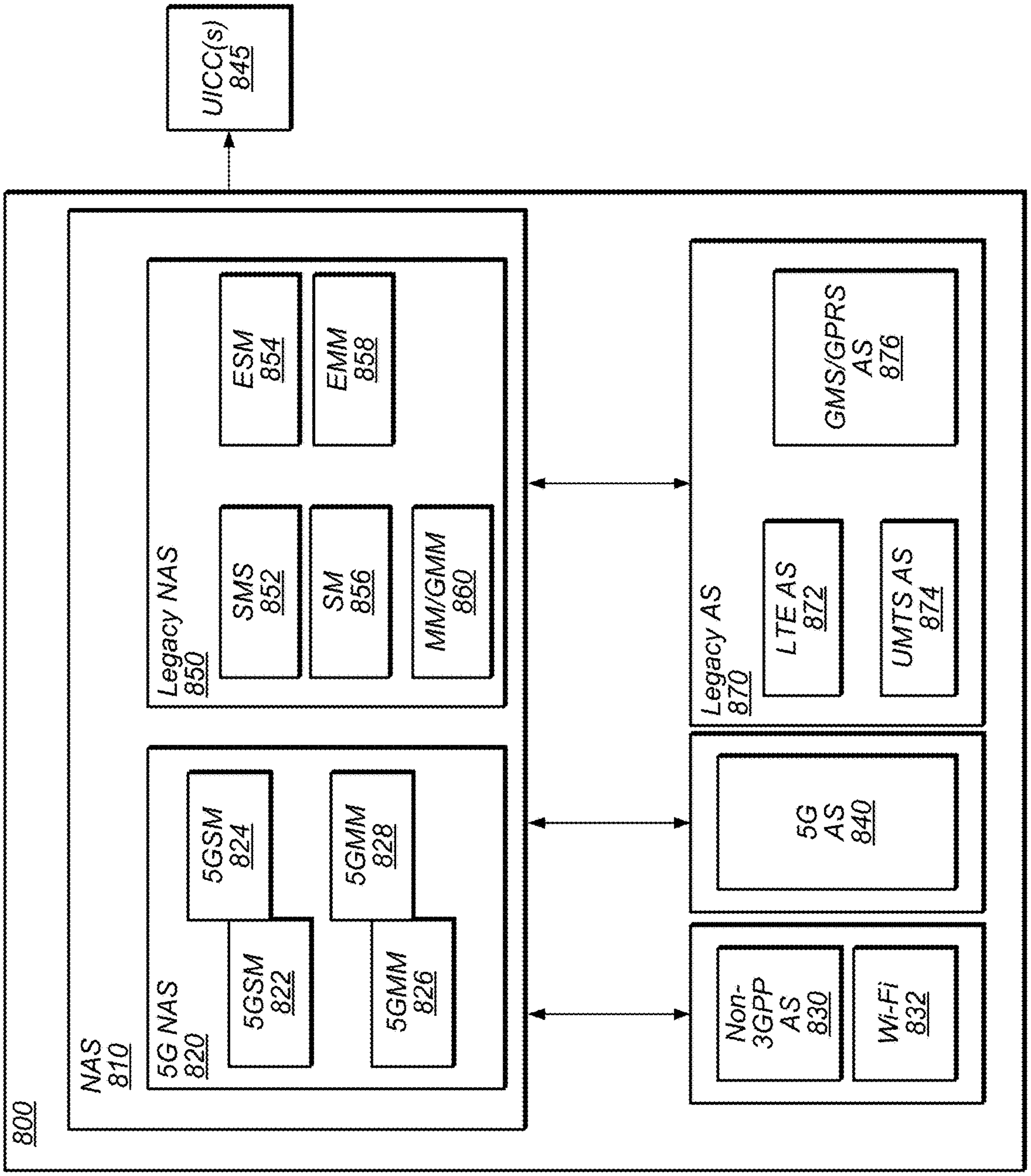
FIG. 8 illustrates an example of a baseband processor architecture for a UE, according to some embodiments.

FIGS. 7A, 7B and 8: 5G Core Network Architecture-Interworking with Wi-Fi In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706*a* and an SMF 706*b* of the 5G CN. The AMF 706 may be connected to (or in communication with) the SMF 706*a*. In some embodiments, such functional entities may reside on (and/or be executed by and/or be supported by) one or more servers 104 located within the RAN and/or core network. Further, the gNB 604 may in communication with (or connected to) a user plane function (UPF) 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or CNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706*a* and the UPF 708*a*. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF706*a* and the SMF 706*b* of the 5G CN. The AMF 706 may be connected to (or in communication with) the SMF 706*a*. In some embodiments, such functional entities may reside on (and/or be executed by and/or be supported by) one or more servers 104 located within the RAN and/or core network. Further, the gNB 604 may in communication with (or connected to) the UPF 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Improved Reference Signal Measurement Mechanisms During Secondary Cell Activation in New Radio Embodiments described herein provide mechanisms for improved reference signal measurement mechanisms during secondary cell activation in New Radio. Furthermore, certain secondary cells (SCells) may further be characterized as physical uplink control channel (PUCCH) SCells which may correspond to a SCell with a PUCCH configuration in a secondary PUCCH group. For example, since certain groups of SCells may not have PUCCH configured for uplink (UL), a PUCCH SCell in a secondary PUCCH group may be configured for UL PUCCH, and the other cell which may have PUCCH may be a primary cell (PCell). More specifically, during secondary cell (SCell) (e.g., a physical uplink control channel (PUCCH) SCell) activation it may be beneficial for the UE and or network to determine certain known or assumed conditions regarding pathloss reference signals (PL-RS). This may support pathloss estimation associated with subsequent or future transmissions (corresponding to certain beams) with the Scell. For example, a known PUCCH Scell may correspond to a PUCCH cell on which the UE has already performed measurements on (e.g., before the SCell has been activated), and a known PL-RS may have been previously determined based on said measurements. Accordingly, having already performed reference signal measurements on the SCell, the UE may be aware of certain timing configurations/timing information corresponding to the SCell and/or have access to available layer-3 (L3) measurements for the target PUCCH SCell and PL-RS which could be used in subsequent communications with the SCell. In some embodiments, for a known physical uplink control channel (PUCCH) secondary cell (SCell), certain transmission configuration indicator (TCI) states, pathloss reference signals (PL-RSs), and/or spatial relation indications may be based on one or more layer-3 (L3) measurements. As described in 3GPP technical specification (TS) 38.213, PL-RSs may be used to support determinations or calculations of downlink pathloss estimates (e.g., dB loss) for PUCCH SCells. More specifically, a UE may calculate a pathloss estimate in decibels (dB) by using a reference signal resource index for an active downlink bandwidth part of a serving cell and sounding reference signal (SRS) resource set, according to some embodiments. Additionally, the RS resource index may be provided by a PL-RS associated with the SRS resource set and may be either a synchronization signal block index (SSB-Index) providing a synchronization signal/physical broadcast channel (SS/PBCH) block index or a channel state information-reference signal index (CSI-RS-Index) providing a CSI-RS resource index.

Additionally or alternatively, an unknown PUCCH SCell may correspond to a PUCCH SCell that has not been previously measured by the UE. In other words, the UE may not have previously performed reference signal measurements of the PUCCH SCell and therefore L3 measurements of the target PUCCH SCell and corresponding PL-RS may not be available. Accordingly, the UE may need to perform additional measurements (e.g., PL-RS measurements) to estimate pathloss since no previous measurements of the PUCCH SCell may have been made and/or stored by the UE. Additionally or alternatively, for an unknown PUCCH SCell, TCI states, PL-RSs and spatial relation indications may be based on a layer-1 reference signal received power (L1-RSRP) measurement.

However, even if the PL-RS is known, it may be further beneficial for the UE and/or network to be aware of whether a PL-RS is maintained. For example, if a PL-RS is considered to be maintained, this may correspond to the UE periodically monitoring for the PL-RS and may additionally have a recent pathloss measurement stored in memory (e.g., the UE has previously measured the PL-RS). Accordingly, it may not be necessary for the UE to perform additional pathloss measurements since the maintained PL-RS measurement may be retrievable from a memory of the UE. Thus power conservation and increased efficiency may be realized by the UE by not having to perform additional measurements.

Additionally or alternatively, if a PL-RS is not maintained, this may correspond to a PL-RS which is not periodically monitored for, and the UE may further need to perform additional measurements to calculate or estimate a pathloss parameter. According to some embodiments, the UE may not have ever performed measurements on a target PUCCH SCell and therefore may not have any stored information regarding PUCCH SCell PL-RS measurements. Additionally or alternatively, if a UE performed a pathloss measurement corresponding to a significant time in the past, the UE may not have that measurement stored in memory (e.g., the measurement has been discarded due to timing requirements) or the measurement may be considered invalid due to the time of measurement being significantly from the past. Accordingly, when a UE is requested to provide a pathloss measurement by a base station, the UE may need to perform additional pathloss measurements since the previous measurements may no longer be useable or applicable.

According to some embodiments, the L1-RSRP measurement report of PL-RS may be replaced by a layer-3 (L3) measurement report of a PL-RS. Additionally or alternatively, for a known PUCCH SCell, the L1-RSRP measurement report of PL-RS may be replaced by a L3 measurement report of a PL-RS. According to some embodiments, for an unknown PUCCH SCell, the PL-RS may be known if the L1-RSRP measurement of PL-RS is reported before the PL-RS activation and the PL-RS remains detectable during the PUCCH SCell activation. Additionally or alternatively, if the L1-RSRP measurement has not been reported before the PL-RS activation, the PL-RS may be considered to be unknown.

According to some embodiments, it may be possible to use the same condition in PL-RS switching delay requirements. For example, an additional delay may not be needed when the PL-RS is maintained before the SCell is activated. Furthermore, it may be beneficial to consider the time uncertainty of media access control-control elements (MAC-CEs) used for PL-RS activation. For example, PL-RS assumptions defined in TS 38.213 may be applied for the PUCCH of a target (e.g., being-activated) SCell during the activation procedure. Additionally or alternatively, in frequency range 2 (FR2), if a user equipment (UE) is not provided pathlossReferenceRSs parameter(s) but instead is provided a PUCCH-SpatialRelationInfo parameter before receiving the PUCCH SCell activation command, the UE may use the associated DL-RS in PUCCH-SpatialRelationInfo as a PL-RS. Accordingly, the PL-RS measurement behavior may be differentiated when it is being maintained or not being maintained. Thus it may be beneficial to determine said whether or not the PL-RS is maintained or how to reuse other measurement results for PL-RS during PUCCH SCell activation procedure. Accordingly, power conservation and increased efficiency may be realized by the UE by not having to perform additional measurements.

Figure 9:
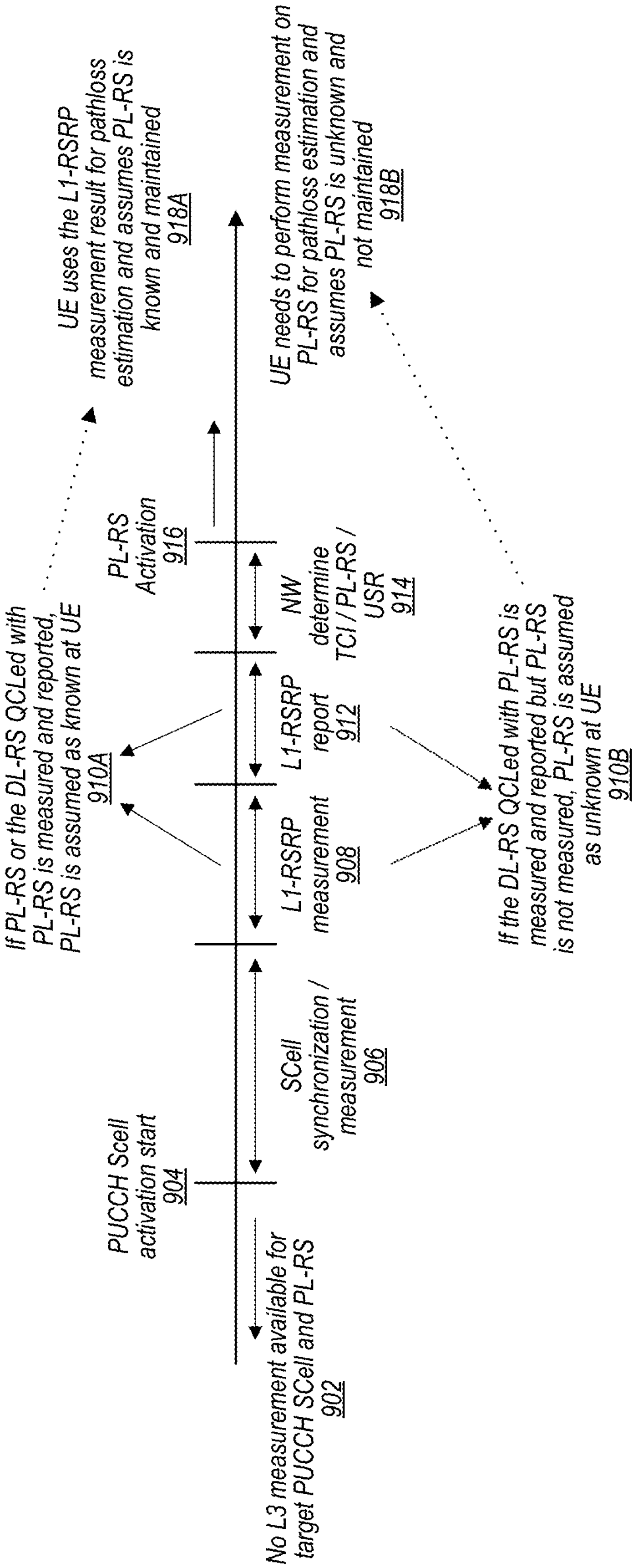
FIG. 9 illustrates an event timeline for an example method for pathloss estimation using PL-RSs and/or DL-RSs for an unknown PUCCH SCell, according to some embodiments.

FIG. 9—Method for Pathloss Estimation Using PL-RSs and/or DL-RSs for an Unknown PUCCH SCell FIG. 9 illustrates an event timeline of an example method for pathloss estimation if the PL-RS and/or other downlink-reference signal (DL-RS) that is quasi-collocated (QCL) with the PL-RS is measured and reported in a L1-RSRP measurement report, according to some embodiments.

Aspects of the method of FIG. 9 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Additionally or alternatively, aspects of the method of FIG. 9 may be implemented by one or more base stations (e.g., BS 102) in communication with a wireless device, such as the UE(s) 106, as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the base station 102 (e.g., processor(s) 304, baseband processor(s), processor(s) associated with communication circuitry, etc., among various possibilities) may cause the base station to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 902, a UE may communicate with a base station (e.g., network node) prior to the start of a PUCCH SCell activation by the base station. For example, the network (e.g., base station) may be configured to provide a primary cell (PCell) for communication with the UE. Additionally, the SCell (e.g., PUCCH SCell) may be considered to be unknown to the UE and correspond to a cell that has not been previously measured by the UE. In other words, the UE may not have previously performed reference signal measurements of the PUCCH SCell and therefore L3 measurements of the PUCCH SCell and corresponding PL-RS may not be available.

In 904, the network (e.g., base station) may start or initiate the activation process of the PUCCH SCell, according to some embodiments. For example, if communications have deteriorated below a threshold (e.g., signal strength has decreased to a less than nominal value) the network (e.g., base station) may further transmit a MAC-CE command to the UE indicating the activation of an SCell. According to some embodiments, this MAC-CE indication may indicate the SCell as a target PUCCH SCell, Accordingly, in 906, the UE and network (e.g., base station) may perform synchronization procedures and/or measurements associated with the target PUCCH SCell.

In 908, the UE may perform L1-RSRP measurements of the PUCCH SCell. For example, after synchronization measurements have been made in 906, the UE may additionally perform RSRP measurements (e.g., L1-RSRP measurements) of the PUCCH SCell. Moreover, if a target PUCCH SCell is unknown, during the PUCCH SCell activation procedure, the UE may perform said L1-RSRP measurements in response to the network (e.g., base station) transmitting a request to the UE to report a L1-RSRP measurement on a PUCCH SCell. According to further embodiments, if the PL-RS is configured by network before the PUCCH SCell activation command, the UE may proceed to 910A or 910B.

In 910A, if the PL-RS is measured or a downlink-reference signal (DL-RS) quasi-collocated (QCL) with the PL-RS is measured and reported in a L1-RSRP measurement report, the UE may assume this PL-RS is known, according to some embodiments. In some embodiments, PL-RS and DL-RS which are QCL may be considered to share or included within a common beam. Accordingly, the UE may use the L1-RSRP measurement result based on the PL-RS or DL-RS QCLed with PL-RS for pathloss estimation and may further assume this PL-RS is maintained. Moreover, this may allow the UE to directly use the pathloss estimation result from the L1-RSRP measurement or report rather than re-performing the PL-RS measurement after PL-RS or uplink spatial relation (USR) activation. According to some embodiments, USR activation may correspond to which uplink beams are activated for use by the UE for uplink transmissions.

Additionally or alternatively, it may be possible for the UE to check or verify whether the PL-RS has or has not been included in the L1-RSRP, according to some embodiments. For example, if the PL-RS is measured and reported in L1-RSRP measurement report, the UE may assume the PL-RS is known. Accordingly, the UE may use the L1-RSRP measurement result based on the PL-RS for an estimation of pathloss and may further assume that the PL-RS is currently maintained. In other words, the UE may perform or have previously performed monitoring procedures regarding measuring the PL-RS. Accordingly, with the PL-RS being known and maintained, this may further allow the UE to directly use the pathloss estimation result from the L1-RSRP measurement or L1-RSRP report (e.g., an L1-RSRP measurement report) rather than re-performing a PL-RS measurement after PL-RS/uplink spatial relation (USR) activation.

In 910B, if only the DL-RS QCLed with the PL-RS is measured (e.g., the PL-RS is not measured) and reported in the L1-RSRP measurement report, the UE may assume this PL-RS is known, according to some embodiments. Accordingly, the UE may need to perform PL-RS measurement after PL-RS/USR activation to get the pathloss estimation. Moreover, in this example, the UE may further assume that this PL-RS is not maintained. In other words, the UE may not periodically monitor for the PL-RS.

According to some embodiments, if the PL-RS is not configured by network before a PUCCH SCell activation command (e.g., in 904), a PL-RS may be assumed to be the same as the DL-RS used for uplink spatial relation. For example, the DL-RS may be measured and/or reported in a L1-RSRP measurement and/or report and the UE may assume this PL-RS is known. Accordingly the UE may use the L1-RSRP measurement result based on the DL-RS for USR and further may assume this PL-RS is maintained. Accordingly, the UE may directly use the pathloss estimation result from L1-RSRP rather than re-performing PL-RS measurement after USR activation. Additionally or alternatively, a UE may usually determine to perform new PL-RS measurements after PL-RS/USR activation for pathloss estimation regardless of whether the L1-RSRP measurement and/or reporting was performed before the PL-RS/USR activation).

According to some embodiments, the network may indicate to the UE whether or not to perform new PL-RS measurement after PL-RS/USR activation and the UE may follow (e.g., perform according to) the indication. Additionally or alternatively, the indication may be included as part of a radio resource control (RRC) message, a MAC-CE, or a downlink control information (DCI).

In 912, having performed 910A or 910B, the UE may generate a L1-RSRP report based on the L1-RSRP measurements. Additionally, the UE may transmit the measurement report (e.g., the L1-RSRP report) to the base station, e.g., via the PCell and/or SCell. The report may be transmitted in response to a received request, or based on a schedule, according to some embodiments. Accordingly, based on the received measurement report, the network (e.g., base station) may in 914 determine the PL-RS, TCI states, and USR corresponding to the UE's interaction with the PUCCH SCell. More specifically, the reference signal (RS) configured for L1-RSRP may be associated with a network TCI, PL-RS and USR. In other words, the network may use different transmit (Tx) beams to transmit those RSs and the network may configure the UE to report the L1-RSRP based on those RSs. Accordingly, the network may then be able to determine, based on the measurements, which Tx beam is best (e.g., most efficient and/or corresponding to the highest L1-RSRP) for this UE and which receive (Rx) beam is the best to receive signals from UE based on the RS with the strongest L1-RSRP. Thus, the network may use one or more RSs with the strongest L1-RSRP measurement results from a configured RS to determine which TCI/PL-RS/USR shall be configured to this UE.

In 916, the PL-RS may be activated by the network, according to some embodiments. For example, the network may configure a media access control-control element (MAC-CE) for the UE such that the UE may utilize the PL-RS for pathloss estimation or, according to some embodiments, remeasure the PL-RS.

If the PL-RS is measured or a downlink-reference signal (DL-RS) quasi-collocated (QCL) with the PL-RS is measured and reported in a L1-RSRP measurement report (and the UE assumes this PL-RS is known), according to the embodiment described in 910A, the UE may proceed from 916 to 918A. In 918A, if the PL-RS or downlink-reference signal (DL-RS) is quasi-collocated (QCL) with PL-RS that is measured and reported in a L1-RSRP measurement report, the UE may assume this PL-RS is known, according to some embodiments. Accordingly, the UE may then use the L1-RSRP measurement result for pathloss estimation and further assume that the PL-RS is known and maintained. Additionally, this may allow the UE to avoid having to perform additional measurements and thus conserve power and reducing timing requirements.

Alternatively, if only the DL-RS QCLed with the PL-RS is measured (e.g., the PL-RS is not measured) and reported in L1-RSRP measurement report, (and the UE may assume this PL-RS is known), according to the embodiment described in 910B, the UE may proceed from 916 to 918B. in 918B, if only the DL-RS QCLed with the PL-RS is measured (e.g., the PL-RS is not measured) and reported in L1-RSRP measurement report, the UE may assume this PL-RS is known, according to some embodiments. Accordingly, the UE may need to perform additional measurements on the PL-RS for pathloss estimation and may further assume the PL-RS is unknown and not maintained.

Figure 10:
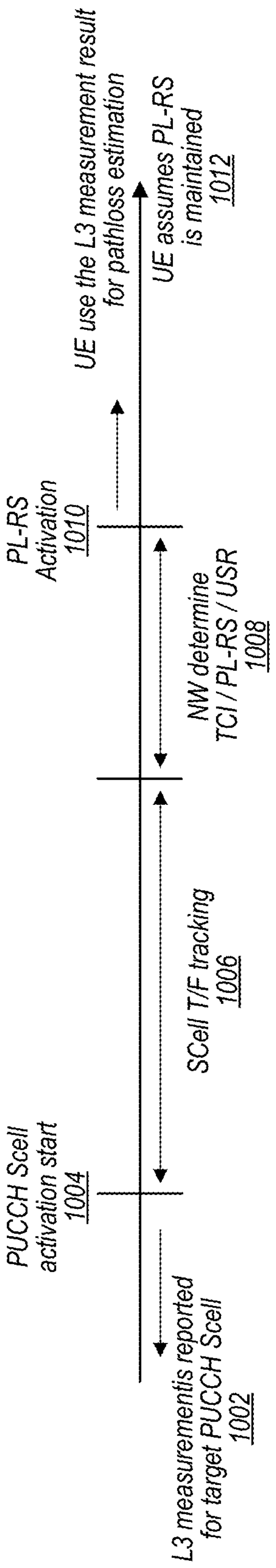
FIG. 10 illustrates an event timeline for an example method for pathloss estimation using PL-RSs and/or DL-RSs for a known PUCCH SCell, according to some embodiments.

FIG. 10—Method for Pathloss Estimation Using PL-RSs and/or DL-RSs for a Known PUCCH SCell FIG. 10 illustrates an event timeline for an example method for pathloss estimation using PL-RSs and/or DL-RSs for a known (e.g., previously measured) PUCCH SCell. More specifically, the UE may estimate pathloss through use of the L3 measurement result based on a measurement of the PL-RS or a DL-RS QCLed with PL-RS, according to some embodiments.

Aspects of the method of FIG. 10 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Additionally or alternatively, aspects of the method of FIG. 10 may be implemented by one or more base stations (e.g., BS 102) in communication with a wireless device, such as the UE(s) 106, as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the base station 102 (e.g., processor(s) 304, baseband processor(s), processor(s) associated with communication circuitry, etc., among various possibilities) may cause the base station to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 1002, a UE may communicate with a base station (e.g., network node) prior to the start of a PUCCH SCell activation by the network (e.g., base station), according to some embodiments. For example, the network (e.g., base station) may be configured to provide a primary cell (PCell) and further transmit a MAC CE command to the UE indicating the activation of an SCell. Additionally, the SCell may be a PUCCH SCell and may be considered to be known to the UE and correspond to a cell that has been previously measured by the UE. In other words, the UE may have previously performed reference signal measurements of the PUCCH SCell and therefore L3 measurements of the target PUCCH SCell and corresponding PL-RS may be available (e.g., have been previously reported).

In 1004, the base station may start or initiate the activation process of the PUCCH SCell, according to some embodiments. Additionally or alternatively, if a target PUCCH SCell is known, during the PUCCH SCell activation procedure the network may not request a UE to report a L1-RSRP measurement on the PUCCH SCell for TCI determination and USR (e.g., for FR2). Additionally, in 1006, the UE and network (e.g., base station) may perform SCell timing/frequency (T/F) Tracking, synchronization procedures, and/or measurements associated with the PUCCH SCell. According to some embodiments, even though the SCell may be known (e.g., SCell coarse timing is known to the UE because of a previous measurement), the UE may still need to perform T/F tracking regarding fine timing and frequency.

In 1008, the network (e.g., base station) may determine and/or configure the PL-RS, TCI states, and USR corresponding to the UE's interaction with the PUCCH SCell, according to some embodiments. For example, the network may determine or configure which uplink beams of the PUCCH SCell should be activated for use by the UE for uplink transmissions.

In 1010, the PL-RS may be activated by the network, according to some embodiments. For example, the network may configure a media access control-control element (MAC-CE) for the UE such that the UE may utilize the PL-RS for pathloss estimation or, according to some embodiments, remeasure the PL-RS. Additionally or alternatively, the network may activate at least one of the TCI and the USR based on the determination and/or configurations (further based on the measurement report) of the TCI and/or USR corresponding to the SCell.

In 1012, the UE may use the L3 measurement result based on a PL-RS or DL-RS QCLed with PL-RS for pathloss estimation and may further assume the PL-RS is known and maintained as long as target PUCCH Scell is known, according to some embodiments. Accordingly, the UE may then directly use the pathloss estimation result from the L3 measurement rather than re-performing an additional PL-RS measurement after PL-RS/USR activation.

Additionally or alternatively, the UE may check or verify if the PL-RS is or is not included in the L3-RSRP, according to some embodiments. For example, if a PL-RS is measured and reported in a L3 measurement report, the UE may assume this PL-RS is known. Accordingly, the UE may use the L3 measurement result based on the PL-RS for pathloss estimation and may further assume this PL-RS is maintained. More specifically, this may allow the UE to directly use the pathloss estimation result from the L3 measurement rather than re-performing a PL-RS measurement after PL-RS/USR activation.

According to some embodiments, if only a DL-RS QCLed with PL-RS is measured and reported in the L3 measurement report, the UE may assume the corresponding PL-RS is known. Accordingly, the UE may need to perform PL-RS measurement after PL-RS/USR activation to determine the pathloss estimation and may further assume this PL-RS is not maintained. As a third option, a UE may typically determine or decide to perform new PL-RS measurement after PL-RS/USR activation for pathloss estimation regardless of a L3 measurement or report being performed or generated before PUCCH SCell activation, according to some embodiments. As a fourth option, the network may indicate to the UE whether or not to perform new PL-RS measurement after PL-RS/USR activation and the UE may follow (e.g., perform actions corresponding to) the indication, according to some embodiments. Additionally or alternatively, the indication may be included as part of a radio resource control (RRC) message, a MAC-CE, or a downlink control information (DCI).

Figure 11:
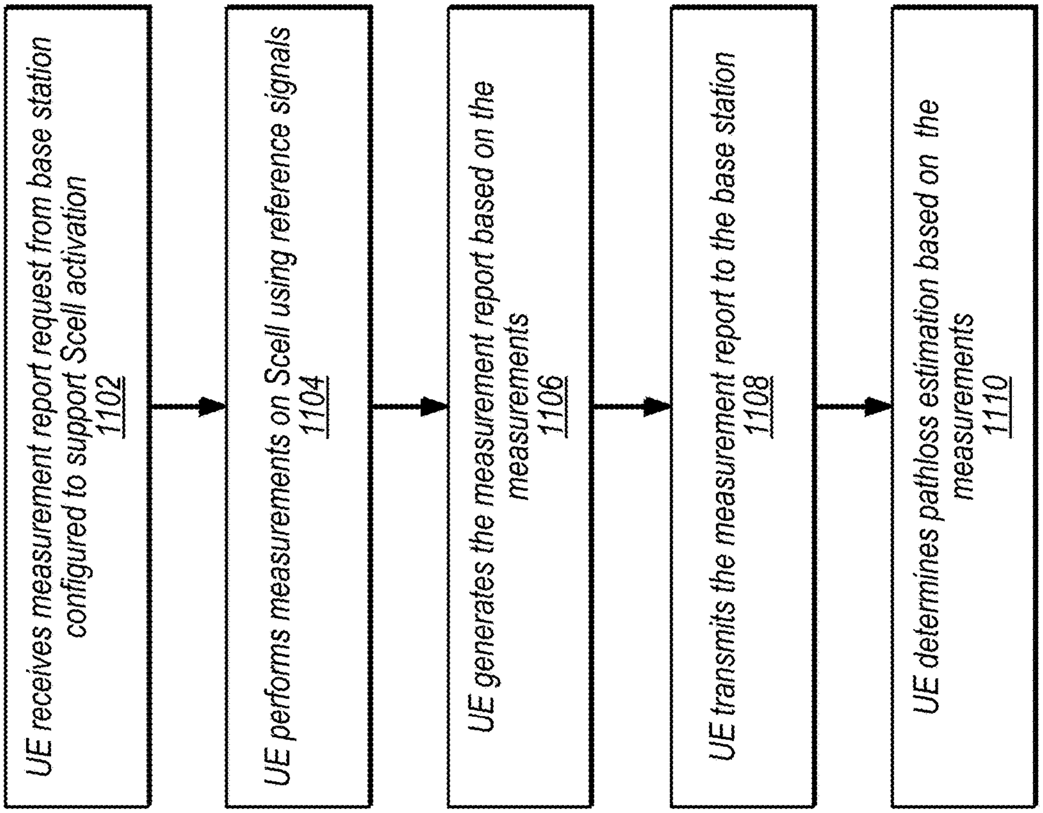
FIG. 11 illustrates a flowchart depicting an example method for reference signal-based pathloss estimation corresponding to secondary cell activation in NR, according to some embodiments.

FIG. 11—Reference Signal-Based Pathloss Estimation During Secondary Cell Activation in New Radio FIG. 11 illustrates a flowchart depicting an example method for pathloss estimation using reference signals and during secondary cell activation in NR, according to some embodiments.

Aspects of the method of FIG. 11 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Additionally or alternatively, aspects of the method of FIG. 11 may be implemented by one or more base stations (e.g., BS 102) in communication with a wireless device, such as the UE(s) 106, as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the base station 102 (e.g., processor(s) 304, baseband processor(s), processor(s) associated with communication circuitry, etc., among various possibilities) may cause the base station to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 1102, a UE may receive a measurement report request from a base station which supports SCell (e.g., PUCCH SCell) activation, according to some embodiments. For example, the network (e.g. a base station) may be configured to provide a primary cell for initial communications with a UE and further, depending on certain conditions (e.g., channel conditions), make a determination to activate a secondary cell and accordingly transmit a request for a measurement report from the UE. More specifically, activation of an SCell may be initiated by the network due to a need for more capacity or bandwidth to support larges amount of data traffic. In the case of PUCCH Scell activation, this may correspond to UL control channel resources being limited due to high traffic loads. Accordingly, it may be beneficial for the network to activate another PUCCH group to enlarge or broaden the UL control resource capacity. Furthermore, in some embodiments, the SCell may or may not have been previously measured by the UE. Additionally or alternatively, the measurement report may be usable by the BS in determining at least one of a transmission configuration indicator (TCI) and an uplink spatial relation corresponding to the UE.

In 1104, a UE may perform measurements on the SCell (e.g., PUCCH SCell) using one or more reference signals. Additionally or alternatively, the one or more RSs may include at least one of one or more pathloss-reference signals (PL-RSs) and/or one or more other downlink reference signals (DL-RSs). In some embodiments, the one or more PL-RSs may or may not have been configured by the base station prior to the request. According to further embodiments, the one or more PL-RSs may be quasi-collocated (QCL) with the one or more DL-RSs. Additionally or alternatively, the UE may further perform one or more additional pathloss measurements based at least in part on the one or more DL-RSs being QCL with the one or more PL-RS and an activation of at least one of a PL-RS and uplink spatial relation (USR).

In 1106, a UE may generate the measurement report based on the measurements and further transmit the measurement report to the base station in 1108. According to further embodiments, the measurement report may be a layer-1 (L1) reference signal received power (RSRP) measurement report.

In 1110, the UE may determine a pathloss estimation based on the measurements. In some embodiments, the UE may further perform one or more additional pathloss measurements based at least in part on an activation of at least one of the one or more PL-RSs and an uplink spatial relation (USR). Additionally or alternatively, the UE may determine an additional pathloss estimation based on the one or more additional pathloss measurements. According to some embodiments, the UE may further receive an indication from the base station to perform one or more additional pathloss measurements after activation of at least one of the one or more PL-RSs and an USR or refrain from performing one or more additional pathloss measurements after activation of at least one of the one or more PL-RSs and an USR. Additionally or alternatively, the indication may be included in at least one of radio resource control (RRC) signaling, media access control (MAC), or downlink control information (DCI).

According to some embodiments, the (e.g., PUCCH) SCell may have been previously measured by the UE and the measurement report may be a layer-3 (L3) reference signal received power (RSRP) measurement report. Accordingly, the UE may use the L3 RSRP report to determine a pathloss estimation which may be usable by the UE in avoiding performing additional pathloss measurements.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:

receiving, from a base station (BS) configured to support activation of a secondary cell (SCell), a request to provide a measurement report;

performing, in response to the request, one or more measurements on the SCell using one or more reference signals (RSs);

generating, based on the one or more measurements, the measurement report;

transmitting the measurement report to the BS;

determining, based on the one or more measurements, a pathloss estimation;

performing, based at least in part on an activation of at least one of the one or more PL-RSs and an uplink spatial relation (USR), one or more additional pathloss measurements; and determining, based on the one or more additional pathloss measurements, an additional pathloss estimation.

2. The method of claim 1, wherein the SCell is a physical uplink control channel (PUCCH) SCell which has not previously been measured a user equipment (UE).

3. The method of claim 1, wherein the one or more RSs comprise at least one of one or more pathloss-reference signals (PL-RSs) and one or more downlink reference signals (DL-RSs).

4. The method of claim 3, wherein the one or more PL-RSs are configured by the base station prior to the request.

5. The method of claim 3, wherein the one or more PL-RSs are quasi-collocated (QCL) with the one or more DL-RSs.

6. The method of claim 5, further comprising:

performing, based at least in part on the one or more DL-RSs being QCL with the one or more PL-RS and an activation of at least one of a PL-RS and uplink spatial relation (USR), one or more additional pathloss measurements; and determining, based on the one or more additional pathloss measurements, an additional pathloss estimation.

7. A processor, comprising:

memory storing instructions that, when executed, cause the processor to:

receive, from a base station (BS) configured to support activation of a secondary cell (SCell), a request to provide a measurement report;

perform, in response to the request, one or more measurements on the SCell using one or more reference signals (RSs);

generate, based on the one or more measurements, the measurement report;

transmit the measurement report to the BS;

determine, based on the one or more measurements, a pathloss estimation;

perform, based at least in part on an activation of at least one of the one or more PL-RSs and an uplink spatial relation (USR), one or more additional pathloss measurements; and determine, based on the one or more additional pathloss measurements, an additional pathloss estimation.

8. The processor of claim 7, wherein the instructions are further executable to cause the processor to:

receive, from the BS, an indication to:

perform one or more additional pathloss measurements after activation of at least one of the one or more PL-RSs and an uplink spatial relation (USR); or refrain from performing one or more additional pathloss measurements after activation of at least one of the one or more PL-RSs and an uplink spatial relation (USR).

9. The processor of claim 8, wherein the indication is comprised in at least one of radio resource control (RRC) signaling, media access control (MAC), or downlink control information (DCI).

10. The processor of claim 7, wherein the measurement report is a layer-1 (L1) reference signal received power (RSRP) measurement report.

11. The processor of claim 7, wherein the measurement report is usable by the BS in determining at least one of a transmission configuration indicator (TCI) and an uplink spatial relation corresponding to a user equipment (UE).

12. The processor of claim 7, wherein the instructions are further executable to cause the processor to:

report, based on the one or more RSs being configured by the BS prior to activation of the SCell, a layer-3 reference signal received power (L3-RSRP) measurement to the BS before activation of the SCell.

13. The processor of claim 12, wherein the instructions are further executable to cause the processor to:

determine, based on the L3-RSRP measurement, the pathloss estimation.

14. The processor of claim 7, wherein the SCell is a physical uplink control channel (PUCCH) SCell which has not previously been measured by a user equipment (UE).

15. An apparatus, comprising:

a processor configured to, when executing instructions stored in a memory, perform operations comprising:

receiving, from a base station (BS) configured to support activation of a secondary cell (SCell), a request to provide a measurement report;

performing, in response to the request, one or more measurements on the SCell using one or more reference signals (RSs);

generating, based on the one or more measurements, the measurement report;

transmitting the measurement report to the BS;

determining, based on the one or more measurements, a pathloss estimation;

performing, based at least in part on an activation of at least one of the one or more PL-RSs and an uplink spatial relation (USR), one or more additional pathloss measurements; and determining, based on the one or more additional pathloss measurements, an additional pathloss estimation.

16. The apparatus of claim 15, wherein the SCell is a physical uplink control channel (PUCCH) SCell which has not previously been measured a user equipment (UE).

17. The apparatus of claim 15, wherein the one or more RSs comprise at least one of one or more pathloss-reference signals (PL-RSs) and one or more downlink reference signals (DL-RSs).

18. The apparatus of claim 17, wherein the one or more PL-RSs are configured by the base station prior to the request.

19. The apparatus of claim 17, wherein the one or more PL-RSs are quasi-collocated (QCL) with the one or more DL-RSs.

20. The apparatus of claim 15, further comprising:

a radio operably coupled to the processor.

* * * * *